United States Patent Office 3,296,443
Patented Jan. 3, 1967

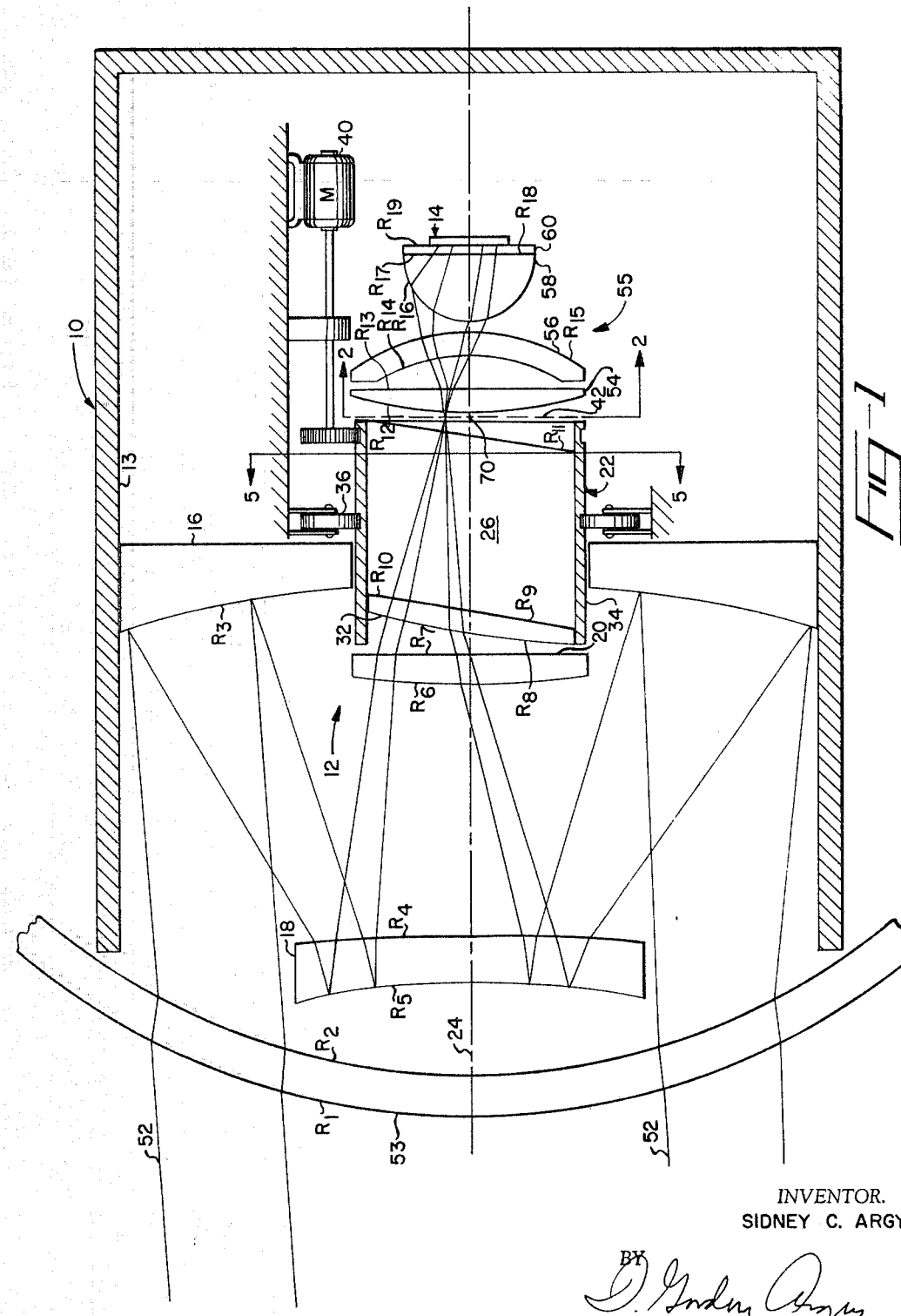

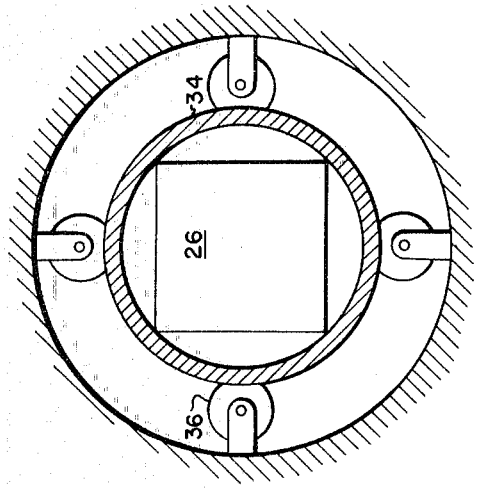
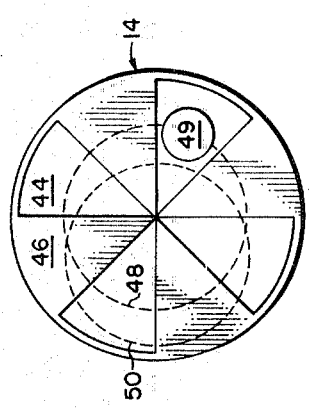
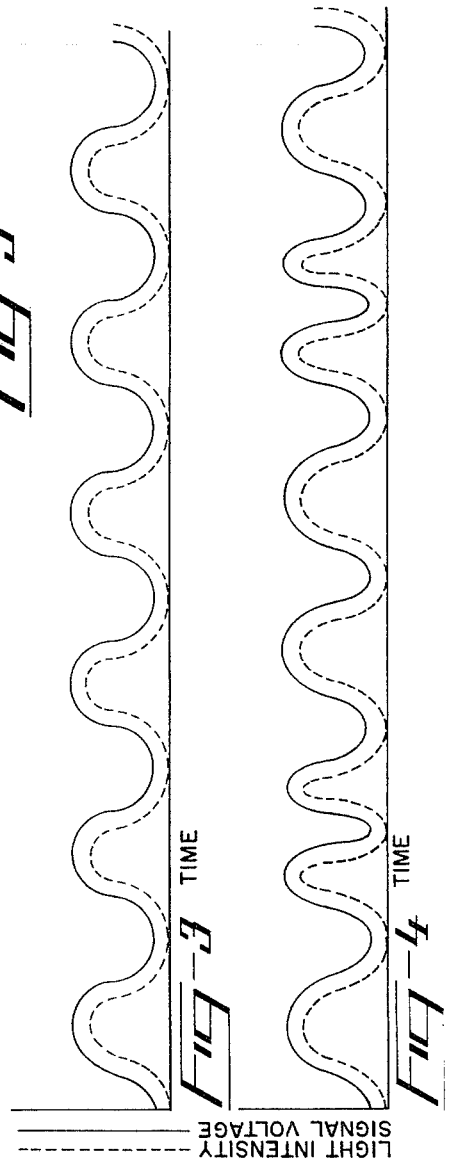
INVENTOR.
SIDNEY C. ARGYLE

3,296,443
COMPACT OPTICAL TRACKING SYSTEM
Sidney C. Argyle, Glendora, Calif., assignor to Aerojet-General Corporation, Azusa, Calif., a corporation of Ohio
Filed Feb. 24, 1961, Ser. No. 91,544
2 Claims. (Cl. 250—203)

This invention relates generally to a tracking device and in particular to an optical infrared tracking head.

Infrared tracking systems have been used to direct vehicles such as guided missiles or aircraft to their targets. Such tracking systems typically comprise an optical system combined with some kind of infrared detector. They operate in such a way that the output signal from the detector varies when the object being guided moves off target. The information contained in the variation in the output signal is then fed into suitable servomechanisms which steer the vehicle back to its proper course.

Prior infrared tracking systems used to guide these vehicles were rather bulky and insensitive. This characteristic was particularly objectionable on guided missiles. Accordingly, an important object of this invention is to provide a sensitive and compact infrared optical tracking head.

In its principal aspect, the invention comprises an optical system and an infrared detector. The optical system includes a Cassegrainian portion and an image nutator. A reticle is positioned at the focal plane of the optical system. With this arrangement, the image of a distant object viewed by the optical system is sharply focused on the reticle, while moving thereon along a generally circular path. If the object viewed is on the axis of the optical system, the generally circular image path will be concentric with the optical axis. If the object viewed is off the optical axis, the generally circular image path will not be concentric with the optical axis.

The reticle is provided with light transmitting portions and opaque portions disposed in the path of the moving image. These light transmitting and opaque portions are so arranged that when the image path is concentric with the optical axis, the pulses of light passing through the reticle will have a predetermined pattern. When the object viewed is off the optical axis, the image will pass over different parts of the light transmitting and opaque portions of the reticle, producing thereby a different pattern of light pulses passing through the reticle. Each position of an object off the optical axis produces a pattern of light pulses characteristic of that position.

The optical system also includes a field lens to focus the image of the entrance aperture of the optical system on the detector. With this arrangement, each light pulse passing through the reticle illuminates the image of the entrance aperture on the detector, causing it to produce a corresponding output signal.

Suitable analyzers and servomechanisms are connected to the vehicle being guided to alter its course in response to the information contained in the detector output signal. In this way, the course of the vehicle may be altered to bring it back on target.

Other objects of this invention will become more apparent when read in the light of the accompanying drawings and specification, wherein:

FIG. 1 is a side view, partly in cutaway cross section, of the optical infrared tracking head.

FIG. 2 is a sectional view taken on the line 2—2 of FIG. 1, and showing in dotted lines the image point locus of on-target objects and the image point locus of off-target objects.

FIG. 3 shows the pattern of the intensity of light passing through the reticle and the signal output from the detector when the infrared tracking head is on target.

FIG. 4 shows one pattern of the intensity of light passing through the reticle and the signal output from the detector when the infrared tracking head is off target.

FIG. 5 is a sectional view taken on the line 5—5 of FIG. 1.

Referring now to FIG. 1 of the drawing, the infrared tracking head indicated generally by the reference numeral 10 comprises an optical system indicated generally by the reference numeral 12, and an infrared detector 14 mounted in optical contact in a medium having a refractive index greater than that of air. It is understood that in optics it is common to refer to items in optical contact with one another as being "immersed" one with respect to another.

The elements of the optical system are mounted in a support 13 by any suitable means (not shown). As shown in the drawing, the optical system includes a Cassegrainian type telescope portion for viewing distant objects, an associated image nutator, and a field lens. The Cassegrainian portion comprises a spherical positive collector mirror 16 having a front surface $R_3$ and a thick spherical negative mirror 18 having front surface $R_4$ and a reflective rear surface $R_5$. Mirror 18 is positioned in front of the primary mirror 16 as shown in FIG. 1. In addition, a collimator lens 20 having front and rear surfaces $R_6$ and $R_7$ is mounted on the axis 24 of the optical system between mirrors 16 and 18. Lens 20 cooperates with other optical elements to hold the image of the entrance aperture (in this case the collector mirror 16) at infinity, for reasons to become apparent below. The thick mirror 18 has the added function of controlling the major portion of the spherical abberations introduced into the optical system, but this correction introduces a considerable amount of chromatic abberation. The collimating lens 20 is therefore given the added function of controlling this chromatic abberation, but in doing so, this lens re-introduces a small amount of spherical aberration into the optical system. This spherical aberration, however, can be minimized by a judicious selection of the other optical components. If further control of the various abberations is desired, mirror 16 can be thick in order to introduce other corrections.

The image nutator 22 is mounted on the optical axis 24 of the optical system 12, and in this embodiment, the image nutator is coaxial with the Cassegrainian portion and generally concentric with mirror 16. This arrangement is highly desirable because it permits the optical system to be unusually light and compact without sacrificing its ability to view distant objects.

The image nutator comprises an inclined plate 26 mounted on the optical axis 24 adjacent rear surface $R_7$ on the collimating lens 20. Plate 26 has front and rear major planar surfaces $R_{10}$ and $R_{11}$ which are inclined to the optical axis 24 as shown in FIG. 1. The effect of the inclined plate 26 is to cause a generally radial shift of the image of an object viewed by the optical system. Thus, if the image of the object viewed by the optical system would fall on the optical axis 24 without the inclined plate, the addition of the inclined plate 26 would displace the image so that it falls off the optical axis. This displacement, however, introduces certain aberrations (coma and astigmatism) and to compensate for them, a spherical lens 32 having front and rear surfaces $R_8$ and $R_9$ is cemented to the front major planar surface $R_{10}$ of the inclined plate 26. With this arrangement, the image of an object viewed by the optical system and on the optical axis would be sharply focused off the optical axis. Lens 32 has an added function in that it cooperates with the collimating lens 20 in holding the image of the entrance aperture or mirror 16 at infinity.

It is noted that there may be circumstances where severe control of chromatic aberration is not required. In such an event, the collimating lens 20 may be omitted and surface $R_{11}$ of the inclined plate 26 may be ground so surfaces $R_{10}$ and $R_{11}$ are no longer parallel to provide the same end result as imaging the entrance aperture at infinity.

As seen in FIGS. 1 and 5, the inclined plate 26 and spherical lens 32 are mounted in a tube 34 which is rotatably supported by bearings 36. The tube is rotated by a motor 40 through a suitable drive. Thus, the image nutator causes the radially shifted image of an object viewed by the optical system to move along a generally circular path.

A reticle 42 is mounted on the optical axis 24 adjacent the major planar surface $R_{11}$ and in the focal plane of the optical system. Consequently, the sharply focused image of an object viewed by the optical system moves along a generally circular path on the reticle. With this arrangement, the image of an object viewed by the optical system and on the optical axis will move on the reticle along a generally circular path 48 (see FIG. 2), and this path is concentric with the axis of the optical system. On the other hand, if the object viewed by the optical system is off the optical axis, its image will also move along some generally circular path 50 (see FIG. 2). However, in this case, path 50 is no longer concentric with the optical axis.

The reticle 42, in this particular embodiment, is divided into a plurality of equal circular segments. This arrangement is desirable for reasons to become apparent below, but it is not essential, and segments having other shapes are contemplated. Circular segments 44 are light transmitting and circular segments 46 are opaque. As seen in FIG. 2, the light transmitting segments 44 are in uniform angularly spaced relation to each other around the axis of the optical system and are separated from each other by the opaque circular segments 46, as shown. Consequently, the generally circular path 48 followed by the image of objects lying on the optical axis will have alternately spaced light transmitting and opaque portions of equal length. In addition, the size of the image 49 on the reticle coming from an object lying on the optical axis, is generally equal to the arc length of a circular segment 44 along circular path 48. As a result, there is no abrupt transition as the image moves from the light transmitting segments 44 to the opaque segments 46. Therefore, the intensity of light passing through the reticle from the image of objects lying on the optical axis will vary generally sinusoidally. This characteristic is desirable from the standpoint of frequency variation detection.

On the other hand, as seen in FIG. 2, when the object viewed by the optical system is off the optical axis, so that its image follows a circular path 50 which is not concentric with the optical axis, the length of the opaque and light transmitting portions of a typical path 50 will no longer be equal. Consequently, the intensity of light passing through the reticle will no longer vary sinusoidally at a constant frequency (see FIG. 4). It is also apparent that the pattern of the light intensity passing through the reticle from objects not lying on the optical axis will vary from point to point.

The behavior of the optical system so far described can be illustrated by following a bundle of rays represented by line 52 coming from a point object off the optical axis 24. These rays pass through the hyper-hemispherical irdome 53 (in the case of an infrared tracking head). The irdome is rigidly mounted on the vehicle and serves as a protective cover for the optical components. After passing through irdome 53, the rays fall on surface $R_3$ of the spherical positive collector mirror 16 and are then reflected to the spherical negative mirror 18 where they are refracted by surface $R_4$, reflected by surface $R_5$, and again refracted by surface $R_4$. The rays then pass through the collimating lens 20 where they are refracted by surfaces $R_6$ and $R_7$. After refraction, the rays pass through the correcting lens 32 and inclined plate 26 where they are again refracted. On emerging from plate 26, the rays are focused on the reticle 42. As stated above, pulses of light pass through the reticle, and this light then passes through the field lens assembly 55 to the detector 14. As shown in the drawings, the field lens assembly comprises lenses 54, 56, 58, and 60.

The function of the field lens assembly 55 is to image the entrance aperture (in this case, mirror 16) on detector 14. The detector 14, as stated above, may be immersed in a medium having a refractive index greater than air. This is important because it makes the size of the image of the entrance aperture on the detector smaller. This increases the flux density of the light on the detector so that the system is more sensitive. Since the collimating lens 20 in cooperation with spherical lens 32 causes the image of the entrance aperture to appear to be at infinity, the image of the collector mirror 16 on the detector 14 will be stationary despite the movement of the target image along the field path.

FIG. 1 shows a cross sectional view of the optical system. The light is considered to travel from left to right. The formula for the optical system described above is as follows:

| Radii in Inches | Thickness in Inches | $N_{1.9\mu}$ | $N_{2.2\mu}$ | $N_{2.5\mu}$ | $\nu$ |
| --- | --- | --- | --- | --- | --- |
| $R_1 = 4.00$ | $t_{1,2}, .25$ | 1.5028 | 1.4988 | 1.4943 | 58.68 |
| $R_2 = 3.75$ | $t_{2,3}, 2.85$ | Air | | | |
| $R_3 = -7.00$ | $t_{3,4}, 2.10$ | Air | | | |
| $R_4 = -12.50$ | $t_{4,5}, .25$ | 1.5028 | 1.4988 | 1.4943 | 58.68 |
| $R_5 = -5.90$ | $t_{5,4}, .25$ | 1.5028 | 1.4988 | 1.4943 | 58.68 |
| $R_4 = -12.50$ | $t_{4,6}, 1.44$ | Air | | | |
| $R_6 = 5.42$ | $t_{6,7}, .180$ | 1.8501 | 1.8458 | 1.8413 | 96.14 |
| $R_7 = \infty$ | $t_{7,8}, .010$ | Air | | | |
| $R_8 = 5.15$ at 12° | $t_{8,9}, .120$ at 12° | 1.5028 | 1.4988 | 1.4943 | 58.6 |
| $R_9 = \infty$ at 12° | $t_{9,10}, .000$ | (1) | (1) | | |
| $R_{10} = \infty$ at 12° | $t_{10,11}, 1.00$ at 12° | 1.8501 | 1.8458 | 1.8413 | 96.14 |
| $R_{11} = \infty$ at 12° | $t_{11,12}, .187$ | Air | | | |
| $R_{12} = .309$ | $t_{12,13}, .123$ | 1.8501 | 1.8458 | 1.8413 | 96.14 |
| $R_{13} = \infty$ | $t_{13,14}, .085$ | Air | | | |
| $R_{14} = -.295$ | $t_{14,15}, .084$ | 1.8501 | 1.8458 | 1.8413 | 96.14 |
| $R_{15} = -.254$ | $t_{15,16}, .014$ | Air | | | |
| $R_{16} = .1125$ | $t_{16,17}, .124$ | 1.8501 | 1.8458 | 1.8413 | 96.14 |
| $R_{17} = \infty$ | $t_{17,18}, .000$ | (1) | (1) | | |
| $R_{18} = \infty$ | $t_{18,19}, .014$ | 1.5028 | 1.4988 | 1.4943 | 58.68 |
| $R_{19} = \infty$ | | | | | |

1 Optical cement.
$N_{1.9\mu}$ represents refractive index at 1.9 microns.
$N_{2.2\mu}$ represents refractive index at 2.2 microns.
$N_{2.5\mu}$ represents refractive index at 2.5 microns.
$\nu$ represents the dispersion number for each element in the spectral region from 1.9$\mu$ to 2.5

With this arrangement, each time a pulse of light passes through one of the light transmitting portions 44 of the reticle, it will light up the image of the collector mirror 16 on the detector causing the detector to emit a corresponding pulse. Consequently, the output signal of the detector will have the same general shape as the variation of the light intensity passing through the reticle. This means that for targets on the axis of the optical system, the output of the detector 14 will be a generally fixed frequency sine wave. On the other hand, targets off the optical axis will cause a frequency variation in the output of the detector (see FIG. 4), and the particular frequency variation will be characteristic of the position of the object in relation to the axis of the optical system.

Suitable analyzers and servomechanisms are connected to the vehicle being guided, to alter its course in response to the information contained in the frequency of the detector output signal. In this way, the course of the vehicle is altered to bring the vehicle back on target.

It is noted that the support 13 for the optical system is pivotally mounted by any suitable means (not shown) on pivot point 70, at the center of curvature of the irdome (see FIG. 1). This permits a large field of view to be searched without optical coupling or the introduction of objectionable aberrations. Although the irdome is shown as generally spherical, it serves as an optical window. Consequently, it could have other shapes, provided the shapes do not introduce objectionable aberrations.

This invention is to be limited only in accordance with the scope of the appended claims, since others skilled in the art may devise other embodiments still within the limits of the claims.

I claim:
1. An infrared tracking head comprising in combination an optical system and an infrared detector, said optical system comprising a spherical positive mirror, a thick spherical negative mirror positioned in front of the positive mirror, a collimating lens positioned between the positive and negative mirrors to collimate the principal rays passing through the center of said optical system so that the principal rays are made parallel to the axis of said optical system, a transparent plate mounted on the axis of said optical system, said plate having front and rear planar major surfaces each of which is inclined at an angle relative to said optical axis, a spherical correcting lens cemented on the front planar major surface of the transparent plate for correcting aberrations introduced by said plate, a reticle positioned on said optical axis adjacent the rear planar major surface of said plate and positioned so the image of an object in the field of view of the optical system is sharply focused thereon, means for rotating said transparent plate and said spherical correcting lens to cause the image on said reticle to move in a generally circular path, said reticle having at least one opening in part of the generally circular path of the image moving thereon, and a field lens mounted on the optical axis to the rear of said reticle to focus the image of the entrance aperture on the infrared detector so that any infrared light pulse passing through the reticle illuminates the image of the entrance aperture on the infrared detector and produces a corresponding output signal in the detector.

2. An optical system having numerical data substantially as follows:

| Radii in Inches | Thickness in Inches | $N_{1.9\mu}$ | $N_{2.2\mu}$ | $N_{2.5\mu}$ | $u$ |
|---|---|---|---|---|---|
| $R_1 = 4.00$ | $t_{1,2}, .25$ | 1.5028 | 1.4988 | 1.4943 | 58.68 |
| $R_2 = 3.75$ | $t_{2,3}, 2.85$ | Air | | | |
| $R_3 = -7.00$ | $t_{3,4}, 2.10$ | Air | | | |
| $R_4 = -12.50$ | $t_{4,5}, .25$ | 1.5028 | 1.4988 | 1.4943 | 58.68 |
| $R_5 = -5.90$ | $t_{5,4}, .25$ | 1.5028 | 1.4988 | 1.4943 | 58.68 |
| $R_4 = -12.50$ | $t_{4,6}, 1.44$ | Air | | | |
| $R_6 = 5.42$ | $t_{6,7}, .180$ | 1.8501 | 1.8458 | 1.8413 | 96.14 |
| $R_7 = \infty$ | $t_{7,8}, .010$ | Air | | | |
| $R_8 = 5.15$ at $12°$ | $t_{8,9}, .120$ at $12°$ | 1.5028 | 1.4988 | 1.4943 | 58.6 |
| $R_9 = \infty$ at $12°$ | $t_{9,10}, .000$ | (1) | (1) | | |
| $R_{10} = \infty$ at $12°$ | $t_{10,11}, 1.00$ at $12°$ | 1.8501 | 1.8458 | 1.8413 | 96.14 |
| $R_{11} = \infty$ at $12°$ | $t_{11,12}, .187$ | Air | | | |
| $R_{12} = .309$ | $t_{12,13}, .123$ | 1.8501 | 1.8458 | 1.8413 | 96.14 |
| $R_{13} = \infty$ | $t_{13,14}, .085$ | Air | | | |
| $R_{14} = -.295$ | $t_{14,15}, .084$ | 1.8501 | 1.8458 | 1.8413 | 96.14 |
| $R_{15} = -.254$ | $t_{15,16}, .014$ | Air | | | |
| $R_{16} = .1125$ | $t_{17,18}, .124$ | 1.8501 | 1.8458 | 1.8413 | 96.14 |
| $R_{17} = \infty$ | $t_{17,18}, .000$ | (1) | (1) | | |
| $R_{18} = \infty$ | $t_{18,19}, .014$ | 1.5028 | 1.4988 | 1.4943 | 58.68 |
| $R_{19} = \infty$ | | | | | |

1 Optical cement.
$N_{1.9\mu}$ represents refractive index at 1.9 microns.
$N_{2.2\mu}$ represents refractive index at 2.2 microns.
$N_{2.5\mu}$ represents refractive index at 2.5 microns.
* represents the dispersion number for each element in the spectral region from $1.9\mu$ to $2.5\mu$.

References Cited by the Examiner

UNITED STATES PATENTS

| | | | |
|---|---|---|---|
| 2,165,078 | 7/1939 | Toulon | 88—57 |
| 2,730,013 | 1/1956 | Mandler | 88—57 |
| 2,858,453 | 10/1958 | Harris | 88—2.3 |
| 2,865,253 | 12/1958 | Thielens | 88—57 |
| 2,931,912 | 4/1960 | Macleish | 250—233 X |
| 2,942,118 | 6/1960 | Gedance | 250—233 X |
| 2,964,636 | 12/1960 | Cary | 88—57 |
| 2,967,246 | 1/1961 | Ostergren | 250—203 |
| 2,967,247 | 1/1961 | Turck | 250—203 |
| 2,970,220 | 1/1961 | Bouwers | 88—57 |

FOREIGN PATENTS 1,199,438   6/1959   France.

JEWELL H. PEDERSEN, *Primary Examiner.*

BENJAMIN A. BORCHELT, ARTHUR M. HORTON,
*Examiners.*

P. G. BETHERS, S. W. ENGLE, E. S. BAUER,
*Assistant Examiners.*